(12) United States Patent
Poeselt et al.

(10) Patent No.: US 12,391,791 B2
(45) Date of Patent: Aug. 19, 2025

(54) THERMOPLASTIC POLYURETHANE USEFUL FOR PNEUMATIC HOSES

(71) Applicant: BASF SE, Ludwigshafen (DE)

(72) Inventors: Elmar Poeselt, Hamburg (DE); Dieter Nitschke, Quernheim (DE); Birte Lahrmann, Holdorf (DE); Dirk Kempfert, Stemwede-Dielingen (DE)

(73) Assignee: BASF SE, Ludwigshafen am Rhein (DE)

( * ) Notice: Subject to any disclaimer, the term of this patent is extended or adjusted under 35 U.S.C. 154(b) by 85 days.

(21) Appl. No.: 15/128,332

(22) PCT Filed: Mar. 25, 2015

(86) PCT No.: PCT/EP2015/056414
§ 371 (c)(1),
(2) Date: Sep. 22, 2016

(87) PCT Pub. No.: WO2015/144765
PCT Pub. Date: Oct. 1, 2015

(65) Prior Publication Data
US 2017/0233520 A1 Aug. 17, 2017

(30) Foreign Application Priority Data

Mar. 25, 2014 (EP) .................................... 14161471

(51) Int. Cl.
| | | |
|---|---|---|
| *F16L 11/08* | (2006.01) |
| *B29B 9/10* | (2006.01) |
| *B29B 9/12* | (2006.01) |
| *B29C 45/00* | (2006.01) |
| *B29K 75/00* | (2006.01) |
| *B29K 105/06* | (2006.01) |
| *B29L 23/00* | (2006.01) |
| *B32B 1/08* | (2006.01) |
| *B32B 5/02* | (2006.01) |
| *B32B 27/12* | (2006.01) |
| *B32B 27/40* | (2006.01) |
| *C08G 18/24* | (2006.01) |
| *C08G 18/32* | (2006.01) |
| *C08G 18/40* | (2006.01) |
| *C08G 18/42* | (2006.01) |
| *C08G 18/44* | (2006.01) |
| *C08G 18/48* | (2006.01) |

(Continued)

(52) U.S. Cl.
CPC ............ *C08G 18/7671* (2013.01); *B29B 9/10* (2013.01); *B29B 9/12* (2013.01); *B29C 45/0001* (2013.01); *B32B 1/08* (2013.01); *B32B 5/024* (2013.01); *B32B 27/12* (2013.01); *B32B 27/40* (2013.01); *C08G 18/244* (2013.01); *C08G 18/3206* (2013.01); *C08G 18/4018* (2013.01); *C08G 18/4202* (2013.01); *C08G 18/4238* (2013.01); *C08G 18/4277* (2013.01); *C08G 18/44* (2013.01); *C08G 18/4825* (2013.01); *C08G 18/4833* (2013.01); *C08G 18/4854* (2013.01); *C08G 18/664* (2013.01); *C08G 18/6674* (2013.01); *C08K 5/13* (2013.01); *C08K 7/02* (2013.01); *F16L 11/08* (2013.01); *B29C 2045/0091* (2013.01); *B29K 2075/00* (2013.01); *B29K 2105/06* (2013.01); *B29L 2023/005* (2013.01); *B32B 2262/101* (2013.01); *B32B 2262/103* (2013.01); *B32B 2274/00* (2013.01); *B32B 2307/41* (2013.01); *B32B 2307/412* (2013.01); *B32B 2307/414* (2013.01); *B32B 2307/51* (2013.01); *B32B 2307/536* (2013.01); *B32B 2597/00* (2013.01); *C08K 5/005* (2013.01); *Y10T 428/1393* (2015.01)

(58) Field of Classification Search
CPC ............ C08G 18/3206; C08G 18/4825; C08G 18/4854; C08G 18/6505; C08G 18/6511; C08G 18/7671; B29K 2075/00; C08L 75/08; B32B 27/40; B32B 2597/00; B32B 1/08
USPC .............................................. 428/34.1–36.92
See application file for complete search history.

(56) References Cited

U.S. PATENT DOCUMENTS

| | | | | |
|---|---|---|---|---|
| 4,526,952 A * | 7/1985 | Zeitler | ................. | B29C 70/882 |
| | | | | 252/511 |
| 4,684,490 A * | 8/1987 | Taller | ..................... | B29C 41/14 |
| | | | | 264/296 |

(Continued)

FOREIGN PATENT DOCUMENTS

| | | | | |
|---|---|---|---|---|
| CA | 2267629 A1 * | 10/1999 | ............. | C08G 18/65 |
| DE | 102005000923 A1 * | 7/2006 | ............. | B01J 19/26 |

(Continued)

OTHER PUBLICATIONS

International Search Report issued Jun. 10, 2015 in PCT/EP2015/056414, filed Mar. 25, 2015.

(Continued)

*Primary Examiner* — Michael C Romanowski
(74) *Attorney, Agent, or Firm* — Grüneberg and Myers PLLC

(57) ABSTRACT

The present invention relates to a thermoplastic polyurethane obtainable or obtained by the conversion of at least a polyisocyanate composition, propane-1,3-diol as chain extender and a polyol composition, wherein no further chain extender is used aside from propane-1,3-diol, to a process for preparing such a thermoplastic polyurethane, and to the use of such a polyurethane for production of injection molded products, extrusion products, films and shaped bodies.

16 Claims, No Drawings

(51) Int. Cl.
*C08G 18/66* (2006.01)
*C08G 18/76* (2006.01)
*C08K 5/13* (2006.01)
*C08K 7/02* (2006.01)
*C08K 5/00* (2006.01)

(56) References Cited

U.S. PATENT DOCUMENTS

| | | | | |
|---|---|---|---|---|
| 4,804,716 | A * | 2/1989 | Flexman, Jr. | C08L 59/02 |
| | | | | 525/399 |
| 4,915,473 | A * | 4/1990 | Haese | G02B 1/046 |
| | | | | 250/231.19 |
| 4,917,850 | A * | 4/1990 | Gray | A61B 42/10 |
| | | | | 264/306 |
| 5,458,935 | A * | 10/1995 | Alzner | F16L 11/06 |
| | | | | 604/524 |
| 5,539,054 | A * | 7/1996 | LaFleur | C08L 75/04 |
| | | | | 525/125 |
| 5,624,966 | A * | 4/1997 | Narayan | C08G 18/6564 |
| | | | | 521/117 |
| 5,762,643 | A * | 6/1998 | Ray | A61F 13/5146 |
| | | | | 604/383 |
| 6,319,985 | B1 * | 11/2001 | Bruning | C08L 75/04 |
| | | | | 525/131 |
| 6,951,674 | B1 * | 10/2005 | Wu | C08L 75/06 |
| | | | | 604/915 |
| 6,960,186 | B1 * | 11/2005 | Fukaya | A61M 25/1027 |
| | | | | 604/103.06 |
| 7,163,522 | B1 * | 1/2007 | Wang | A61M 25/1029 |
| | | | | 604/524 |
| 2002/0052461 | A1 | 5/2002 | Forschner et al. | |
| 2002/0123601 | A1 * | 9/2002 | Sonnenschein | C08G 18/6674 |
| | | | | 528/76 |
| 2004/0131863 | A1 * | 7/2004 | Belliveau | B32B 27/08 |
| | | | | 428/423.1 |
| 2004/0134555 | A1 * | 7/2004 | Powell | B32B 1/08 |
| | | | | 138/141 |
| 2004/0201133 | A1 * | 10/2004 | Dewanjee | B29C 39/006 |
| | | | | 264/259 |
| 2005/0008806 | A1 * | 1/2005 | Schewe | B29C 48/10 |
| | | | | 428/36.9 |
| 2005/0048236 | A1 * | 3/2005 | Watkins | B32B 27/306 |
| | | | | 428/35.2 |
| 2005/0261447 | A1 * | 11/2005 | Koshiro | A63B 37/0076 |
| | | | | 525/453 |
| 2007/0106047 | A1 * | 5/2007 | Malz | C08G 18/4072 |
| | | | | 528/44 |
| 2009/0069526 | A1 * | 3/2009 | Henze | C08G 18/6674 |
| | | | | 528/65 |
| 2009/0104449 | A1 | 4/2009 | Farah et al. | |
| 2010/0152405 | A1 | 6/2010 | Sunkara | |
| 2010/0239803 | A1 | 9/2010 | Farkas et al. | |
| 2010/0249906 | A1 * | 9/2010 | Zamore | A61M 25/1029 |
| | | | | 428/36.9 |
| 2010/0255317 | A1 * | 10/2010 | Saito | C08G 18/4238 |
| | | | | 428/425.5 |
| 2011/0177020 | A1 * | 7/2011 | Mahmoud | C08G 18/0823 |
| | | | | 424/78.23 |
| 2011/0240064 | A1 * | 10/2011 | Wales | C09D 7/65 |
| | | | | 428/116 |
| 2011/0275779 | A1 * | 11/2011 | Prissok | C08G 18/758 |
| | | | | 528/85 |
| 2012/0041141 | A1 * | 2/2012 | Otomo | C08G 18/6651 |
| | | | | 524/588 |
| 2012/0083187 | A1 | 4/2012 | Okamoto et al. | |
| 2014/0053908 | A1 * | 2/2014 | Smillie | B32B 15/082 |
| | | | | 137/1 |
| 2014/0093668 | A1 * | 4/2014 | Freidank | F16L 59/15 |
| | | | | 428/35.7 |
| 2014/0223832 | A1 | 8/2014 | Okamoto et al. | |
| 2014/0333001 | A1 | 11/2014 | Farkas et al. | |
| 2015/0246994 | A1 * | 9/2015 | Moore | A61L 27/54 |
| | | | | 521/157 |

FOREIGN PATENT DOCUMENTS

| | | | | |
|---|---|---|---|---|
| EP | 0633277 A1 * | 1/1995 | | C08G 18/66 |
| EP | 0 922 552 A1 | 6/1999 | | |
| EP | 0 959 104 A1 | 11/1999 | | |
| WO | WO-9803218 A1 * | 1/1998 | | A61L 29/06 |
| WO | WO 98/56845 A1 | 12/1998 | | |
| WO | WO-0051660 A1 * | 9/2000 | | A61L 29/06 |
| WO | WO-2005123836 A1 * | 12/2005 | | C08G 18/3206 |
| WO | WO-2006029853 A1 * | 3/2006 | | C08G 18/4808 |
| WO | WO 2006/082183 A1 | 8/2006 | | |
| WO | WO 2015/000722 A1 | 1/2015 | | |

OTHER PUBLICATIONS

"Polyurethane", Kunststoff Handbuch 7, Chapter 3.1, Carl Hanser Verlag, 3$^{rd}$ Edition, 1993, 20 pages.

"Polyurethane", Kunststoff-Handbuch Band VII, herausgegeben von Vieweg un Hoechtlen, Carl Hanser Verlag, 1966, 12 pages.

* cited by examiner

THERMOPLASTIC POLYURETHANE USEFUL FOR PNEUMATIC HOSES

The present invention relates to a thermoplastic polyurethane obtainable or obtained by conversion of at least a polyisocyanate composition, propane-1,3-diol as chain extender and a polyol composition. In one embodiment, the present invention relates to a thermoplastic polyurethane obtainable or obtained by conversion of at least a polyisocyanate composition, propane-1,3-diol as chain extender and a polyol composition, wherein the polyol composition comprises at least polytetrahydrofuran (PTHF) and the polyisocyanate composition comprises at least methylene diphenyl diisocyanate (MDI). The present invention further relates to a process for preparing such thermoplastic polyurethanes, and to the use of such polyurethanes for production of injection molded products, extrusion products, films and shaped bodies.

Thermoplastic polyurethanes for various applications are known in principle from the prior art. By the variation of the feedstocks, it is possible to obtain different profiles of properties.

For example, WO 2006/082183 A1 discloses a process for continuously preparing thermoplastically processible polyurethane elastomers, in which a polyisocyanate, a compound having Zerevitinoff-active hydrogen atoms with a mean molecular weight of 450 g/mol to 5000 g/mol, a chain extender and further auxiliaries and additives are converted. This achieves specific profiles of properties via specific processing.

EP 0 922 552 A1 also discloses a process for continuously producing pellets from thermoplastic polyurethane elastomers, wherein a pelletized material is first produced by reaction of organic diisocyanates, difunctional polyhydroxyl compounds having molecular weights of 500 to 8000 and difunctional chain extenders having molecular weights of 60 to 400 in the presence of catalysts and optionally auxiliaries and/or additives. Use for production of extruded, injection molded or calendered material, especially of cable sheathing, hoses and/or films, is likewise disclosed.

EP 0 959 104 A1 discloses mixtures comprising a thermoplastic polyurethane having a Shore hardness of 60 A to 50 D and ethylene-propylene (EPM) rubbers and/or modified ethylene-propylene (EPM) rubbers, which are likewise used for production of hoses.

WO 98/56845 discloses a thermoplastic polymer which is obtained by reaction of a polyisocyanate, a glycol as chain extender and a polyether polyol. Various isocyanates, chain extenders and polyols are disclosed.

Depending on the type of application, the properties of the thermoplastic polyurethane can be varied via the type of feedstocks and the quantitative ratios used. For example, for use as a hose material, especially for pneumatic hoses, a high burst pressure even at elevated temperatures is necessary. It is possible to influence stability by variation of the polyol component for example. It is also possible to influence stability via the processing, for example by heat treatment. In addition, existing ester variants that exhibit a burst pressure at 70° C. of greater than 20 bar are opaque to translucent and hence unsuitable for many applications.

For various applications, for example for use as cable sheathing, a high heat distortion resistance of the thermoplastic polyurethane used is additionally advantageous. One example of a measure of heat distortion resistance is the onset temperature, determined by means of TMA.

A further problem that occurs particularly in the case of transparent hoses known from the prior art is expansion of the hoses under compressive stress prior to bursting. This leads to a reduction in the transmission frequency of pneumatic signals and is frequently accompanied by unwanted tearing of the hoses over long sections.

Proceeding from the prior art, it was accordingly an object of the present invention to provide improved materials which, even at elevated temperatures, exhibit a good burst pressure when used for production of hoses. It was a further object of the present invention to provide materials having high heat distortion resistance.

According to the invention, this object is achieved by a thermoplastic polyurethane obtainable or obtained by conversion of at least components (i) to (iii):
(i) a polyisocyanate composition;
(ii) propane-1,3-diol as chain extender;
(iii) a polyol composition.

The present invention further relates to a thermoplastic polyurethane obtainable or obtained by conversion of at least components (i) to (iii):
(i) a polyisocyanate composition;
(ii) propane-1,3-diol as chain extender;
(iii) a polyol composition,
wherein no further chain extender is used aside from propane-1,3-diol.

The invention also relates to a thermoplastic polyurethane obtainable or obtained by conversion of at least components (i) to (iii):
a polyisocyanate composition;
(ii) propane-1,3-diol as chain extender;
(iii) a polyol composition,
wherein the polyol composition comprises at least polytetrahydrofuran (PTHF), and the polyisocyanate composition comprises at least methylene diphenyl diisocyanate (MDI).

It has been found that, surprisingly, through the use of propane-1,3-diol as chain extender, especially in the case of use as a sole chain extender or in combination with a defined polyisocyanate composition and a defined polyol composition, a thermoplastic polyurethane having good burst pressure characteristics and high heat distortion resistance is obtained, and is preferably also transparent. It has been found that, surprisingly, through the use of propane-1,3-diol as chain extender, particularly in combination with the defined polyisocyanate composition and the polyol composition, it was possible to produce a hose which, at 70° C., has a burst pressure of greater than 20 bar, and is preferably also transparent. Furthermore, the hoses exhibit essentially localized bursting characteristics.

According to the invention, the thermoplastic polyurethane is obtained or obtainable by conversion of components (i) to (iii). This involves converting a polyisocyanate composition, a polyol composition and propane-1,3-diol as chain extender. In one embodiment, no further chain extender is used aside from propane-1,3-diol.

In the context of the present invention, it is preferable when the proportion of the propane-1,3-diol used in the amount of chain extender used is greater than 85 mol %. If no further chain extender is used aside from propane-1,3-diol, the proportion of the propane-1,3-diol used in the amount of chain extender used is thus 100 mol %.

In a further embodiment, a polyisocyanate composition comprising at least methylene diphenyl diisocyanate (MDI), a polyol composition comprising at least polytetrahydrofuran (PTHF), and propane-1,3-diol as chain extender are converted.

In the context of the present invention, the polyol composition used comprises at least one polyol. The polyol composition may also comprise two or more polyols. For example, the polyol composition comprises at least one polytetrahydrofuran. In a further embodiment, the polyol composition does not comprise any polytetrahydrofuran. If the polyol composition is free of polytetrahydrofuran (PTHF), preferably no polytetrahydrofuran (PTHF) is added as a further component in the conversion of components (i) to (iii).

According to the invention, the polyol composition comprises at least one polyol. Polyols are known in principle to those skilled in the art and are described, for example, in "Kunststoffhandbuch, Band 7, Polyurethane" [Plastics Handbook, Volume 7, Polyurethanes], Carl Hanser Verlag, 3rd edition 1993, chapter 3.1. Particular preference is given to using polyesterols or polyetherols as polyols. It is likewise possible to use polycarbonates. Copolymers may also be used in the context of the present invention. The number-average molecular weight of the polyols used in accordance with the invention is preferably between $0.5 \times 10^3$ g/mol and $8 \times 10^3$ g/mol, preferably between $0.6 \times 10^3$ g/mol and $5 \times 10^3$ g/mol, especially between $0.8 \times 10^3$ g/mol and $3 \times 10^3$ g/mol.

Polyethers are suitable in accordance with the invention, but also polyesters, block copolymers and hybrid polyols, for example poly(ester/amide). Preferred polyetherols in accordance with the invention are polyethylene glycols, polypropylene glycols, polyadipates, polycarbonate(diol)s and polycaprolactone.

In a further embodiment, the present invention accordingly relates to a thermoplastic polyurethane as described above, wherein the polyol composition used comprises at least one polytetrahydrofuran and at least one polyol selected from the group consisting of polyethylene glycol, polypropylene glycol, polyadipates, polycarbonate(diol)s and polycaprolactones.

In a particularly preferred embodiment, the polyol used has a molecular weight Mn in the range from 500 g/mol to 4000 g/mol, preferably in the range from 800 g/mol to 3000 g/mol.

The present invention accordingly relates, in a further embodiment, to a thermoplastic polyurethane as described above, wherein at least one polyol present in the polyol composition has a molecular weight Mn in the range from 500 g/mol to 4000 g/mol.

According to the invention, it is also possible to use mixtures of different polyols. Preferably, the polyols used and the polyol composition have a mean functionality between 1.8 and 2.3, preferably between 1.9 and 2.2, especially 2. Preferably, the polyols used in accordance with the invention have only primary hydroxyl groups.

In one embodiment of the present invention, for preparation of the thermoplastic polyurethane, at least one polyol composition comprising at least polytetrahydrofuran is used as component (iii). According to the invention, the polyol composition may also comprise further polyols as well as polytetrahydrofuran.

According to the invention, for example, further polyethers are suitable, but also polyesters, block copolymers and hybrid polyols, for example poly(ester/amide). Preferred polyetherols in accordance with the invention are polyethylene glycols, polypropylene glycols and polycaprolactone.

In a further embodiment, the present invention accordingly relates to a thermoplastic polyurethane as described above, wherein the polyol composition comprises at least one polytetrahydrofuran and at least one further polyol selected from the group consisting of polyethylene glycol, polypropylene glycol and polycaprolactone.

In a particularly preferred embodiment, the polytetrahydrofuran has a molecular weight Mn in the range from 750 g/mol to 1400 g/mol.

In the context of the present invention, composition of the polyol composition may vary within wide ranges. For example, the content of polytetrahydrofuran may be in the range from 15% to 85%, preferably in the range from 20% to 80%, further preferably in the range from 25% to 75%.

According to the invention, the polyol composition may also comprise a solvent. Suitable solvents are known per se to those skilled in the art.

If polytetrahydrofuran is used, the molecular weight Mn of the polytetrahydrofuran is preferably in the range from 650 to 1400 g/mol. Further preferably, the molecular weight Mn of the polytetrahydrofuran is in the range from 750 to 1400 g/mol.

In a further embodiment, the present invention relates to a thermoplastic polyurethane as described above, wherein the polytetrahydrofuran has a molecular weight Mn in the range from 650 g/mol to 1400 g/mol.

Especially in the case of use of a polytetrahydrofuran having a molecular weight Mn in the range from 650 g/mol to 1400 g/mol, good material properties and/or a good profile of properties for use as a pneumatic hose are obtained.

In a further embodiment, the present invention relates to a thermoplastic polyurethane as described above, wherein the polyol composition used is free of polytetrahydrofuran (PTHF) and no polytetrahydrofuran (PTHF) is used as further component in the conversion. For example, the present invention relates to a thermoplastic polyurethane as described above, wherein no further chain extender is used aside from propane-1,3-diol, the polyol composition used is free of polytetrahydrofuran (PTHF) and no polytetrahydrofuran (PTHF) is used as further component in the conversion.

According to the invention, propane-1,3-diol can be used as chain extender alone. However, it is also possible in the context of the present invention that further chain extenders are used.

In the context of the present invention, it is preferable when the proportion of the propane-1,3-diol used in the amount of chain extender used is greater than 85 mol %, preferably greater than 90 mol %, further preferably greater than 95 mol %, more preferably greater than 98 mol %, especially preferably greater than 99 mol %.

Suitable further chain extenders are, for example, compounds having at least two functional groups reactive toward isocyanates, for example hydroxyl groups, amino groups or thiol groups. In a further embodiment, the present invention accordingly relates to a thermoplastic polyurethane as described above, wherein at least one further chain extender selected from the group consisting of compounds having at least two functional groups reactive toward isocyanates is used.

As well as propane-1,3-diol, chain extenders used in the context of the present invention may, for example, be compounds having hydroxyl or amino groups, especially having two hydroxyl or amino groups. According to the invention, the mean functionality of the mixture of chain extenders used is preferably two.

Preferably in accordance with the invention, further chain extenders used are compounds having hydroxyl groups, especially diols. Diols used with preference may be aliphatic, araliphatic, aromatic and/or cycloaliphatic diols having a molecular weight of 50 g/mol to 220 g/mol. Preference is given to alkanediols having 2 to 10 carbon atoms in the alkylene radical, especially di-, tri-, tetra-, penta-, hexa-, hepta-, octa-, nona- and/or decaalkylene glycols. For the present invention, particular preference is given to 1,2-ethylene glycol, butane-1,4-diol, hexane-1,6-diol. It is also possible to use aromatic compounds such as hydroxyquinone bis(2-hydroxyethyl) ether.

According to the invention, it is also possible to use compounds having amino groups, for example diamines. It is likewise possible to use mixtures of diols and diamines.

Preferably, the chain extender used alongside propane-1,3-diol is a diol having a molecular weight Mw<220 g/mol.

In one embodiment, the present invention relates to a thermoplastic polyurethane as described above, wherein at least one further chain extender selected from the group consisting of aliphatic and aromatic diols, diamines and amino alcohols is used.

In a further embodiment, the present invention relates to a thermoplastic polyurethane as described above, wherein at least one further chain extender selected from the group consisting of monoethylene glycol, aminopropanol, butane-1,4-diol, hexane-1,6-diol and hydroxyquinone bis(2-hydroxyethyl) ether (HQEE) is used.

According to the invention, propane-1,3-diol is preferably used alone as chain extender, meaning that the polyol composition is also free of further chain extenders, for example free of short-chain diamines or diols such as diols having a molecular weight Mw<220 g/mol.

In the context of the present invention, the amount of the chain extender and of the polyol composition used may vary within wide ranges. For example, component (iii) and component (ii) are used in a molar ratio of (iii):(ii) of 1:0.7, 1:2.7 and 1:7.3.

According to the invention, a polyisocyanate composition is used for preparation of the thermoplastic polyurethane. The polyisocyanate composition comprises at least one polyisocyanate. According to the invention, the polyisocyanate composition may also comprise two or more polyisocyanates. For example, in the context of the present invention, a polyisocyanate composition comprising at least methylene diphenyl diisocyanate (MDI) is used for preparation of the thermoplastic polyurethane.

According to the invention, the term "methylene diphenyl diisocyanate" is understood to mean diphenylmethane 2,2'-, 2,4'- and/or 4,4'-diisocyanate or a mixture of two or three isomers. It is thus possible in accordance with the invention to use diphenylmethane 2,2'-, 2,4'- and/or 4,4'-diisocyanate or a mixture of two or three isomers. According to the invention, the polyisocyanate composition may also comprise further polyisocyanates. According to the invention, it is thus also possible that the isocyanate composition comprises methylene diphenyl diisocyanate and at least one further polyisocyanate. According to the invention, however, it is also possible that the isocyanate composition comprises methylene phenyl diisocyanate only.

According to the invention, it is also possible to use a polyisocyanate composition comprising no methylene diphenyl diisocyanate (MDI) for preparation of the thermoplastic polyurethane.

Accordingly, the present invention relates, in a further embodiment, to a thermoplastic polyurethane as described above, wherein the polyisocyanate composition used is free of methylene diphenyl diisocyanate (MDI). In this case, if the polyisocyanate composition used is free of methylene diphenyl diisocyanate (MDI), preferably no methylene diphenyl diisocyanate (MDI) is used as a further component in the conversion.

Preferred polyisocyanates in the context of the present invention are diisocyanates, especially aliphatic or aromatic diisocyanates, further preferably aromatic diisocyanates.

In addition, in the context of the present invention, it is possible to use prereacted prepolymers as isocyanate components, in which some of the OH components have been reacted with an isocyanate in a preceding reaction step. These prepolymers are reacted with the remaining OH components in a subsequent step, the actual polymer reaction, and then form the thermoplastic polyurethane. The use of prepolymers offers the option of using OH components having secondary alcohol groups as well.

Aliphatic diisocyanates used are standard aliphatic and/or cycloaliphatic diisocyanates, for example tri-, tetra-, penta-, hexa-, hepta- and/or octamethylene diisocyanate, 2-methyl-penta-methylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexa-methylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, 4,4'-, 2,4'- and/or 2,2'-methylene dicyclohexyl diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and 4,4'-, 2,4'- and/or 2,2'-methylene dicyclohexyl diisocyanate (H12MDI).

Preferred aliphatic diisocyanates are hexamethylene 1,6-diisocyanate (HDI), 1-isocyanato-3,3,5-trimethyl-5-isocyanatomethylcyclohexane and 4,4'-, 2,4'- and/or 2,2'-methylene dicyclohexyl diisocyanate (H12MDI); especially preferred are 4,4'-, 2,4'- and/or 2,2'-methylene dicyclohexyl diisocyanate (H12MDI) and 1-isocyanato-3,3,5-trimethyl-5-isocyanatomethyl-cyclohexane or mixtures thereof.

In a further embodiment, the present invention relates to a thermoplastic polyurethane as described above, wherein the polyisocyanate composition used comprises at least one polyisocyanate selected from the group consisting of methylene diphenyl diisocyanate (MDI), hexamethylene 1,6-diisocyanate (HDI) and 4,4'-, 2,4'- and 2,2'-methylene dicyclohexyl diisocyanate (H12MDI).

Suitable aromatic diisocyanates are especially naphthylene 1,5-diisocyanate (NDI), tolylene 2,4- and/or 2,6-diisocyanate (TDI), 3,3'-dimethyl-4,4'-diisocyanatodiphenyl (TODI), p-phenylene diisocyanate (PDI), diphenylethane 4,4'-diisocyanate (EDI), diphenylmethane diisocyanate, dimethyl diphenyl 3,3'-diisocyanate, diphenylethane 1,2-diisocyanate and/or phenylene diisocyanate.

Preferred examples of higher-functionality isocyanates are triisocyanates, e.g. triphenylmethane 4,4',4"-triisocyanate, and additionally the cyanurates of the aforementioned diisocyanates, and also the oligomers obtainable by partial reaction of diisocyanates with water, for example the biurets of the aforementioned diisocyanates, and also oligomers obtainable by controlled reaction of semiblocked diisocyanates with polyols having an average of more than two and preferably three or more hydroxyl groups.

According to the invention, the polyisocyanate composition may also comprise one or more solvents. Suitable solvents are known to those skilled in the art. Suitable examples are nonreactive solvents such as ethyl acetate, methyl ethyl ketone and hydrocarbons.

It is further possible in the context of the present invention to use crosslinkers as well, for example the aforementioned higher-functionality polyisocyanates or polyols or else other higher-functionality molecules having two or more functional groups reactive toward isocyanates.

According to the invention, components (i) to (iii) are used in such a ratio that the molar ratio of the sum total of the functionalities of the polyol composition and chain extenders used to the sum total of the functionalities of the isocyanate composition used is in the range from 1:0.8 to 1:1.3. The ratio is preferably in the range from 1:0.9 to 1:1.2, further preferably in the range from 1:0.965 to 1:1.05, more preferably in the range from 1:0.98 to 1:1.03.

In a further embodiment, the present invention relates to a thermoplastic polyurethane as described above, wherein the molar ratio of the sum total of the functionalities of the polyol composition and chain extenders used to the sum total of the functionalities of isocyanate composition used is in the range from 1:0.8 to 1:1.3.

A further parameter which is taken into account in the conversion of components (i) to (iii) is the isocyanate index. The index is defined here as the ratio of the total for number of isocyanate groups of component (i) used in the reaction to the isocyanate-reactive groups, i.e., more particularly, the groups of components (ii) and (iii). At an index of 1000, there is one active hydrogen atom per isocyanate group of component (i). At indices exceeding 1000, there are more isocyanate groups than isocyanate-reactive groups. Preferably, the index in the conversion of components (i) to (iii) is in the range from 965 to 1110, for example in the range from 970 to 1110, further preferably in the range from 970 to 1050, more preferably in the range from 980 to 1030.

In a further embodiment, the present invention relates to a thermoplastic polyurethane as described above, wherein the index in the conversion is in the range from 965 to 1100.

According to the invention, in the conversion of components (i) to (iii), it is possible to add further additives, for example catalysts or auxiliaries and additions. Additions and auxiliaries are known per se to those skilled in the art. According to the invention, it is also possible to use combinations of two or more additives.

In the context of the present invention, the term "additive" is especially understood to mean catalysts, auxiliaries and additions, especially stabilizers, nucleating agents, fillers or crosslinkers.

Suitable additives/additions are, for example, stabilizers, nucleating agents, fillers, for example silicates, or crosslinkers, for example polyfunctional aluminosilicates.

In a further embodiment, the present invention accordingly relates to a thermoplastic polyurethane as described above, wherein the thermoplastic polyurethane comprises at least one additive.

Examples of auxiliaries and additions include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable auxiliaries and additions can be found, for example, in the Kunststoffhandbuch, volume VII, edited by Vieweg and Höchtlen, Carl Hanser Verlag, Munich 1966 (p. 103-113).

Suitable catalysts are likewise known in principle from the prior art. Suitable catalysts are, for example, organic metal compounds selected from the group consisting of tin organyls, titanium organyls, zirconium organyls, hafnium organyls, bismuth organyls, zinc organyls, aluminum organyls and iron organyls, for example tin organyl compounds, preferably tin dialkyls such as dimethyltin or diethyltin, or tin organyl compounds of aliphatic carboxylic acids, preferably tin diacetate, tin dilaurate, dibutyltin diacetate, dibutyltin dilaurate, bismuth compounds such as bismuth alkyl compounds or the like, or iron compounds, preferably iron(MI) acetylacetonate, or the metal salts of the carboxylic acids, for example tin(II) isooctoate, tin dioctoate, titanic esters or bismuth(III) neodecanoate.

In a preferred embodiment, the catalysts are selected from tin compounds and bismuth compounds, further preferably tin alkyl compounds or bismuth alkyl compounds. Particularly suitable are tin(II) isooctoate and bismuth neodecanoate.

The catalysts are typically used in amounts of 0 to 2000 ppm, preferably 1 ppm to 1000 ppm, further preferably 2 ppm to 500 ppm and most preferably of 5 ppm to 300 ppm.

The properties of the thermoplastic polyurethanes of the invention may vary within wide ranges according to the application. The thermoplastic polyurethanes of the invention have, for example, a Shore hardness in the range from 60 A to 80 D, determined according to DIN 53505, preferably in the range from 80 A to 60 D, determined according to DIN 53505, further preferably in the range from 95 A to 58 D, determined according to DIN 53505.

In a further embodiment, the present invention relates to a thermoplastic polyurethane as described above, wherein the thermoplastic polyurethane has a Shore hardness in the range from 60 A to 80 D, determined according to DIN 53505.

As explained, the optical properties of the thermoplastic polyurethanes of the invention are also advantageous. Thus, the thermoplastic polyurethanes in the context of the present invention are preferably translucent, further preferably transparent. This is advantageous for many applications.

In a further embodiment, the present invention relates to a thermoplastic polyurethane as described above, wherein the thermoplastic polyurethane is translucent to transparent.

In an alternative embodiment, the present invention also relates to a thermoplastic polyurethane as described above, wherein the thermoplastic polyurethane is opaque.

In a further aspect, the present invention also relates to a process for preparing a thermoplastic polyurethane, comprising the conversion of components (i) to (iii):
(i) a polyisocyanate composition;
(ii) propane-1,3-diol as chain extender;
(iii) a polyol composition.

In a further aspect, the present invention also relates to a process for preparing a thermoplastic polyurethane, comprising the conversion of components (i) to (iii):
(i) a polyisocyanate composition;
(ii) propane-1,3-diol as chain extender;
(iii) a polyol composition,
wherein no further chain extender is used aside from propane-1,3-diol.

The present invention also further relates to a process for preparing a thermoplastic polyurethane, comprising the conversion of components (i) to (iii):
(i) a polyisocyanate composition;
(ii) propane-1,3-diol as chain extender;
(iii) a polyol composition,
wherein the polyol composition comprises at least polytetrahydrofuran (PTHF) and the polyisocyanate composition comprises at least methylene diphenyl diisocyanate (MDI).

With regard to preferred embodiments of the process, suitable feedstocks or mixing ratios, reference is made to the above remarks which apply correspondingly.

The conversion of components (i) to (iii) can in principle be conducted under reaction conditions known per se. The conversion can be effected batchwise or else continuously, for example in a belt process or a reactive extrusion process.

Suitable processes are described, for example, in EP 0 922 552 A1 or WO 2006/082183 A1

In a preferred embodiment, the conversion of components (i) to (iii) is conducted at elevated temperatures relative to room temperature.

According to the invention, the heating can be effected in any suitable manner known to those skilled in the art.

In the case of a conversion by means of reactive extrusion methods, for example, the reaction is conducted in such a way that the zone temperature is in the range from 170° C. to 245° C., preferably in the range from 180° C. to 235° C., further preferably in the range from 190° C. to 230° C.

Accordingly, the present invention, in a further embodiment, also relates to a process for preparing a thermoplastic polyurethane as described above, wherein the conversion is effected by means of a reactive extrusion process and the zone temperature is in the range from 170° C. to 245° C.

According to the invention, it is also possible that the process comprises further steps, for example a pretreatment of the components or an aftertreatment of the thermoplastic polyurethane obtained. Accordingly, the present invention also relates, in a further embodiment, to a process for preparing a thermoplastic polyurethane as described above, wherein the thermoplastic polyurethane obtained is heat-treated after the conversion.

The thermoplastic polyurethane of the invention or a thermoplastic polyurethane obtained or obtainable by a process according to the invention can be used in various ways. More particularly, the thermoplastic polyurethanes of the invention are suitable for the production of moldings and films, further preferably for the production of hoses.

The present invention therefore also further relates to the use of a thermoplastic polyurethane as described above or of a thermoplastic polyurethane obtainable or obtained by a process of the invention for production of injection molding products, extrusion products, films, and shaped bodies. In a further embodiment, the present invention relates to the use as described above, wherein the shaped body is a hose. The high burst pressure of the thermoplastic polyurethanes of the invention is advantageous here.

The present invention also relates to the injection molding products, extrusion products, films or shaped bodies obtained by a process of the invention, for example hoses, cable sheaths or conveyor belts.

It is also possible in the context of the present invention that the injection molding products, extrusion products, films or shaped bodies obtained are subjected to an aftertreatment.

The present invention further relates to a hose comprising a thermoplastic polyurethane as described above or a thermoplastic polyurethane obtainable or obtained by a process as described above.

This hose may have further constituents. More particularly, the hose may have multiple layers and be reinforced by means of standard measures. Suitable means of reinforcement are, for example, fibers or weaves, for example those composed of glass, textiles or metals.

In a further embodiment, the present invention accordingly relates to a hose as described above, wherein the hose has a multilayer structure.

In a further embodiment, the present invention accordingly relates to a hose as described above, wherein the hose has been reinforced by fibers or weaves.

In the context of the present invention, it is further possible that color pigments or liquid organic dyes are added in the course of production of a shaped body of the invention, especially of a film or hose.

It is further possible in the context of the present invention that the shaped body, for example the film or hose, is subjected to an aftertreatment, for example a crosslinking operation. In a further embodiment, the present invention accordingly relates to a film or hose as described above, wherein the film or hose has been subjected to an aftertreatment.

As the examples also demonstrate, it is possible to use a thermoplastic polyurethane of the invention to obtain a hose which is usable for pneumatic applications and has a burst pressure at 70° C. of greater than 20 bar after heat treatment at the dimensions of 5.8*8.2 mm at a Shore hardness of 98 A.

Further preferred applications are as cable sheathing or else for the production of conveyor belts. The high heat distortion resistance of the thermoplastic polyurethanes of the invention is advantageous for the application as cable sheathing. In the context of the present invention, heat distortion resistance is determined by means of the TMA onset temperature.

Further embodiments of the present invention can be inferred from the claims and examples. It will be apparent that the aforementioned features of the subject matter/processes/uses of the invention and those that are elucidated hereinafter are usable not just in the particular combination specified but also in other combinations, without leaving the scope of the invention. For example, the combination of a preferred feature with a particularly preferred feature, or that of a feature that has not been characterized further with a particularly preferred feature, etc., is implicitly also encompassed even if this combination is not mentioned explicitly.

Illustrative embodiments of the present invention are listed hereinafter, although these do not restrict the present invention. More particularly, the present invention also encompasses those embodiments which arise from the dependency references and hence combinations cited hereinafter.

1. A thermoplastic polyurethane obtainable or obtained by conversion of at least components (i) to (iii):
   (i) a polyisocyanate composition;
   (ii) propane-1,3-diol as chain extender;
   (iii) a polyol composition,
   wherein the polyol composition comprises at least polytetrahydrofuran (PTHF) and the polyisocyanate composition comprises at least methylene diphenyl diisocyanate (MDI).

2. The thermoplastic polyurethane according to embodiment 1, wherein the polyol composition comprises at least one further polyol selected from the group consisting of polyethylene glycol, polypropylene glycol, polycarbonate (diol) and polycaprolactone.

3. The thermoplastic polyurethane according to embodiment 1 or 2, wherein at least one further chain extender selected from the group consisting of compounds having at least two functional groups reactive toward isocyanates is used.

4. The thermoplastic polyurethane according to any of embodiments 1 to 3, wherein at least one further chain extender selected from the group consisting of monoethylene glycol, aminopropanol, butane-1,4-diol and hydroxyquinone bis(2-hydroxyethyl) ether (HQEE) is used.

5. The thermoplastic polyurethane according to any of embodiments 1 to 4, wherein the molar ratio of the sum total of the functionalities of the polyol composition and chain extenders used to the sum total of the functionalities of the isocyanate composition used is in the range from 1:0.8 to 1:1.3.

6. The thermoplastic polyurethane according to any of embodiments 1 to 5, wherein the index in the conversion is in the range from 970 to 1100.
7. The thermoplastic polyurethane according to any of embodiments 1 to 6, wherein the polytetrahydrofuran has a molecular weight Mn in the range from 650 g/mol to 1400 g/mol.
8. The thermoplastic polyurethane according to any of embodiments 1 to 7, wherein the thermoplastic polyurethane has a Shore hardness in the range from 60 A to 80 D, determined according to DIN 53505.
9. The thermoplastic polyurethane of any of embodiments 1 to 8, wherein the thermoplastic polyurethane is translucent to transparent.
10. The thermoplastic polyurethane according to any of embodiments 1 to 9, wherein the thermoplastic polyurethane comprises at least one additive.
11. A process for preparing a thermoplastic polyurethane, comprising the conversion of components (i) to (iii):
    (i) a polyisocyanate composition;
    (ii) propane-1,3-diol as chain extender;
    (iii) a polyol composition,
    wherein the polyol composition comprises at least polytetrahydrofuran (PTHF) and the polyisocyanate composition comprises at least methylene diphenyl diisocyanate (MDI).
12. The use of a thermoplastic polyurethane according to any of embodiments 1 to 10 or of a thermoplastic polyurethane obtainable or obtained by a process according to embodiment 11 for production of injection molding products, extrusion products, films and shaped bodies.
13. The use according to embodiment 12, wherein the shaped body is a hose.
14. A hose comprising a thermoplastic polyurethane according to any of embodiments 1 to 10 or a thermoplastic polyurethane obtainable or obtained by a process according to embodiment 11.
15. The hose according to embodiment 14, wherein the hose has a multilayer structure.
16. The hose according to embodiment 14 or 15, wherein the hose has been reinforced by fibers or weaves.
17. The hose according to any of embodiments 14 to 16, wherein the hose has been subjected to an aftertreatment.
18. A thermoplastic polyurethane obtainable or obtained by conversion of at least components (i) to (iii):
    (i) a polyisocyanate composition;
    (ii) propane-1,3-diol as chain extender;
    (iii) a polyol composition,
    wherein no further chain extender is used aside from propane-1,3-diol.
19. The thermoplastic polyurethane according to embodiment 18, wherein the polyol composition used is free of polytetrahydrofuran (PTHF) and no polytetrahydrofuran (PTHF) is used as further component in the conversion.
20. The thermoplastic polyurethane according to embodiment 18 or 19, wherein the polyisocyanate composition used is free of methylene diphenyl diisocyanate (MDI) and no methylene diphenyl diisocyanate (MDI) is used as further component in the conversion.
21. The thermoplastic polyurethane according to any of embodiments 18 to 20, wherein the polyol composition used comprises at least one polyol selected from the group consisting of polyethylene glycol, polypropylene glycol, polyadipates, polycarbonate(diol)s and polycaprolactones.
22. The thermoplastic polyurethane according to any of embodiments 18 to 21, wherein the polyisocyanate composition used comprises at least one polyisocyanate selected from the group consisting of methylene diphenyl diisocyanate (MDI), hexamethylene 1,6-diisocyanate (HDI) and 4,4'-, 2,4'- and 2,2'-methylene dicyclohexyl diisocyanate (H12MDI).
23. The thermoplastic polyurethane according to any of embodiments 18 to 22, wherein the molar ratio of the sum total of the functionalities of the polyol composition and chain extenders used to the sum total of the functionalities of the isocyanate composition used is in the range from 1:0.8 to 1:1.3.
24. The thermoplastic polyurethane according to any of embodiments 18 to 23, wherein the index in the conversion is in the range from 965 to 1100.
25. The thermoplastic polyurethane of any of embodiments 18 to 24, wherein at least one polyol present in the polyol composition has a molecular weight Mn in the range from 500 g/mol to 4000 g/mol.
26. The thermoplastic polyurethane according to any of embodiments 18 to 25, wherein the thermoplastic polyurethane has a Shore hardness in the range from 60 A to 80 D, determined according to DIN 53505.
27. The thermoplastic polyurethane according to any of embodiments 18 to 26, wherein the thermoplastic polyurethane is translucent to transparent.
28. The thermoplastic polyurethane according to any of embodiments 18 to 26, wherein the thermoplastic polyurethane is opaque.
29. The thermoplastic polyurethane according to any of embodiments 18 to 28, wherein the thermoplastic polyurethane comprises at least one additive.
30. A process for preparing a thermoplastic polyurethane, comprising the conversion of components (i) to (iii):
    (i) a polyisocyanate composition;
    (ii) propane-1,3-diol as chain extender;
    (iii) a polyol composition,
    wherein no further chain extender is used aside from propane-1,3-diol.
31. The use of a thermoplastic polyurethane according to any of embodiments 18 to 29 or of a thermoplastic polyurethane obtainable or obtained by a process according to embodiment 30 for production of injection molding products, extrusion products, films and shaped bodies.
32. A thermoplastic polyurethane obtainable or obtained by conversion of at least components (i) to (iii):
    (i) a polyisocyanate composition;
    (ii) propane-1,3-diol as chain extender;
    (iii) a polyol composition.
33. The thermoplastic polyurethane according to embodiment 32, obtainable or obtained by the conversion of at least components (i) to (iii):
    (i) a polyisocyanate composition;
    (ii) propane-1,3-diol as chain extender;
    (iii) a polyol composition,
    wherein no further chain extender is used aside from propane-1,3-diol.
34. The thermoplastic polyurethane according to embodiment 32 or 33, wherein the polyol composition used is free of polytetrahydrofuran (PTHF) and no polytetrahydrofuran (PTHF) is used as further component in the reaction.
35. The thermoplastic polyurethane according to any of embodiments 32 to 34, wherein the polyisocyanate composition used is free of methylene diphenyl diisocyanate (MDI) and no methylene diphenyl diisocyanate (MDI) is used as further component in the reaction.

36. The thermoplastic polyurethane according to any of embodiments 32 to 35, wherein the polyol composition used comprises at least one polyol selected from the group consisting of polyethylene glycol, polypropylene glycol, polyadipates, polycarbonate(diol)s and polycaprolactones.

37. The thermoplastic polyurethane according to embodiment 32, obtainable or obtained by conversion of at least components (i) to (iii):
 (i) a polyisocyanate composition;
 (ii) propane-1,3-diol as chain extender;
 (iii) a polyol composition,
  wherein the polyol composition comprises at least polytetrahydrofuran (PTHF) and the polyisocyanate composition comprises at least methylene diphenyl diisocyanate (MDI).

38. The thermoplastic polyurethane according to embodiment 37, wherein the polyol composition comprises at least one further polyol selected from the group consisting of polyethylene glycol, polypropylene glycol, polycarbonate(diol) and polycaprolactone.

39. The thermoplastic polyurethane according to embodiment 37 or 38, wherein no further chain extender is used aside from propane-1,3-diol.

40. The thermoplastic polyurethane according to embodiment 37 or 38, wherein at least one further chain extender is used, selected from the group consisting of compounds having at least two functional groups reactive toward isocyanates.

41. The thermoplastic polyurethane according to embodiment 40, wherein at least one further chain extender selected from the group consisting of monoethylene glycol, aminopropanol, butane-1,4-diol, hexane-1,6-diol and hydroxyquinone bis(2-hydroxyethyl) ether (HQEE) is used.

42. The thermoplastic polyurethane according to any of embodiments 37 to 41, wherein the polytetrahydrofuran has a molecular weight Mn in the range from 650 g/mol to 1400 g/mol.

43. The thermoplastic polyurethane according to any of embodiments 32 to 42, wherein the polyisocyanate composition used comprises at least one polyisocyanate selected from the group consisting of methylene diphenyl diisocyanate (MDI), hexamethylene 1,6-diisocyanate (HDI) and 4,4'-, 2,4'- and 2,2'-methylene dicyclohexyl diisocyanate (H12MDI).

44. The thermoplastic polyurethane according to any of embodiments 32 to 43, wherein the molar ratio of the sum total of the functionalities of the polyol composition and chain extenders used to the sum total of the functionalities of the isocyanate composition used is in the range from 1:0.8 to 1:1.3.

45. The thermoplastic polyurethane according to any of embodiments 32 to 44, wherein the characteristic in the conversion is in the range from 965 to 1100.

46. The thermoplastic polyurethane according to any of embodiments 32 to 45, wherein at least one polyol present in the polyol composition has a molecular weight Mn in the range from 500 g/mol to 4000 g/mol.

47. The thermoplastic polyurethane according to any of embodiments 32 to 46, wherein the thermoplastic polyurethane has a Shore hardness in the range from 60 A to 80 D, determined according to DIN 53505.

48. The thermoplastic polyurethane according to any of embodiments 32 to 47, wherein the thermoplastic polyurethane is translucent to transparent.

49. The thermoplastic polyurethane according to any of embodiments 32 to 47, wherein the thermoplastic polyurethane is opaque.

50. The thermoplastic polyurethane according to any of embodiments 32 to 49, wherein the thermoplastic polyurethane comprises at least one additive.

51. A process for preparing a thermoplastic polyurethane, comprising the conversion of components (i) to (iii):
 (i) a polyisocyanate composition;
 (ii) propane-1,3-diol as chain extender;
 (iii) a polyol composition.

52. The process for preparing a thermoplastic polyurethane according to embodiment 51, comprising the conversion of components (i) to (iii):
 (i) a polyisocyanate composition;
 (ii) propane-1,3-diol as chain extender;
 (iii) a polyol composition,
  wherein no further chain extender is used aside from propane-1,3-diol.

53. The process for preparing a thermoplastic polyurethane according to embodiment 51, comprising the conversion of components (i) to (iii):
 (i) a polyisocyanate composition;
 (ii) propane-1,3-diol as chain extender;
 (iii) a polyol composition,
  wherein the polyol composition comprises at least polytetrahydrofuran (PTHF) and the polyisocyanate composition comprises at least methylene diphenyl diisocyanate (MDI).

54. The use of a thermoplastic polyurethane according to any of embodiments 32 to 50 or a thermoplastic polyurethane obtainable or obtained by a process according to any of embodiments 51 to 53 for production of injection molded products, extrusion products, films and shaped bodies.

55. The use according to embodiment 54, wherein the shaped body is a hose.

56. A hose comprising a thermoplastic polyurethane according to any of embodiments 31 to 48 or a thermoplastic polyurethane obtainable or obtained by a process according to any of embodiments 51 to 53.

57. The hose according to embodiment 56, wherein the hose has a multilayer structure.

58. The hose according to embodiment 56 or 57, wherein the hose has been reinforced by fibers or weaves.

59. The hose according to any of embodiments 56 to 58, wherein the hose has been subjected to an aftertreatment.

The examples which follow serve to illustrate the invention, but are in no way restrictive with regard to the subject matter of the present invention.

EXAMPLES

1. Preparation Example I

The following feedstocks were used:
Polyol 1: polyether polyol having an OH number of 112.2 and exclusively primary OH groups (based on tetramethylene oxide, functionality: 2)
Isocyanate 1: aromatic isocyanate (4,4' methylene diphenyl diisocyanate)
CE 1: propane-1,3-diol
CE 2: butane-1,4-diol
Catalyst 1: tin(II) isooctoate (50% in dioctyl adipate)
Stabilizer 1: sterically hindered phenol 1.1 Example of Batchwise Synthesis:

A thermoplastic polyurethane (TPU) was synthesized from diphenylmethane 4,4'-diisocyanate, propane-1,3-diol chain extender, phenolic antioxidant, and polytetrahydrofuran having a number-average molar mass of 1 kg/mol, with stirring in a reaction vessel. The start temperature was 80° C. On attainment of a reaction temperature of 110° C., the solution was poured onto a hotplate heated to 125° C., and the TPU sheet obtained was pelletized after the heat treatment. The measured values were established using injection molded sheets or hoses, with the zone temperatures of the extruders used between 190° C. and 235° C.

The synthesis and properties of thermoplastic polyurethanes obtained are compiled in tables 1 and 2.

For example 3, with a start temperature of 60° C., the mixture is poured out onto a hotplate heated to 80° C. on attainment of a temperature of 80° C.

The products prepared using butane-1,4-diol as chain extender serve as comparative examples.

TABLE 1

Examples of synthesis:

|  | Example 1 | Example 2 | Example 3 | Example 4 |
|---|---|---|---|---|
| Polyol 1 [g] | 750 | 750 | 700 | 750 |
| Isocyanate 1 [g] | 690 | 690 | 646.3 | 690 |
| CE 1 [g] | 154.16 | 155.9 | 142.3 |  |
| CE 2 [g] |  |  |  | 180.1 |
| Stabilizer 1 [g] | 16.1 |  |  |  |
| Index | 990 | 985 | 1000 | 1000 |

TABLE 2

Examples of properties:

|  | Example 1 | Example 2 | Example 3 | Example 4 |
|---|---|---|---|---|
| Shore D | 57 | 56 | 56 | 56 |
| Modulus of elasticity [MPa] | 64 |  |  |  |
| Tensile strength [MPa] | 45 | 37 | 40 | 53 |
| Elongation at break [%] | 490 | 470 | 520 | 420 |
| Tear propagation resistance [kN/m] | 128 | 122 | 131 | 113 |
| Compression set (72 h/23° C./30 min) [%] | 21 | 25 | 25 | 21 |
| Compression set (24 h/70° C./30 min) [%] | 44 | 45 | 49 | 35 |
| Compression set (24 h/100° C./30 min) [%] | 69 | 66 | 76 | 54 |
| Abrasion [mm$^3$] | 36 | 49 | 33 | 36 |
| Burst pressure of non-heat-treated 5.8 * 8.2 mm hoses at 23° C. [bar] | 34.1 | 32.4 | 37.1 | 2.4 |
| Burst pressure of non-heat-treated 5.8 * 8.2 mm hoses at 70° C. [bar] | 19.3 | 19.6 | 20.6 | 12.1 |
| Burst pressure of heat-treated 5.8 * 8.2 mm hoses at 23° C. [bar] | 38.8 | 32.8 | 41.8 | 27.5 |
| Burst pressure of heat-treated 5.8 * 8.2 mm hoses at 70° C. [bar] | 23.1 | 21.2 | 30.8 | 14.7 |

1.2 Example of Continuous Synthesis 1.2.1 Belt Method:

A mixture of propane-1,3-diol chain extender, a phenolic antioxidant, and polytetrahydrofuran having a number-average molar mass of 1 kg/mol was heated to 70° C. and mixed vigorously with diphenylmethane 4,4'-diisocyanate in a mixing head. The reaction mixture obtained was applied at a temperature of 90° C. to a running PTFE belt. The reaction mixture, which had solidified to become a solid strip product (slab) at the end of the belt, was fed continuously and directly at about 80° C. via intake rollers to a comminution and homogenization apparatus. It was comminuted therein at temperatures of about 105° C. and conveyed into a tangential flange-mounted single-shaft extruder. The housing temperatures in the intake region were about 170° C. to 190° C., and in the middle zone 210 to 230° C. The melt that exits at the die plate was converted by an underwater pelletization to homogeneous lenticular pellets and then dried.

1.2.2 Reactive Extrusion Method:

The first housing of a ZSK 92 twin-shaft extruder from Werner & Pfleiderer, Stuttgart, having a process length of 56 D, was charged with a mixture of the propane-1,3-diol chain extender, a phenolic antioxidant and polytetrahydrofuran and a catalyst with a charge temperature of 150° C. and, separately therefrom, the diphenylmethane 4,4'-diisocyanate was metered into the first housing at a charge temperature of 65° C. The speed of the twin screw was 280 min$^{-1}$. The set temperature values for the housing were, in flow direction, 200° C. in the first third of the screw, 170° C. in the second third of the screw, and 190° C. in the last third of the screw. The expulsion rate was 850 kg/h. After the melt chopping by underwater pelletization and integrated centrifugal drying, the pellets were subjected to final drying at about 80 to 90° C.

The pellets were subsequently processed further by injection molding to give test specimens or by extrusion to give hoses. The hoses were run by extrusion in an Arenz 45 mm extruder with a 3-zone screw with a 9.8 mm die and a 6.9 mm mandrel. The zone temperatures were between 180 and 225° C. The hose geometry was adjusted by varying the draw-off speed and pressure in the water bath with vacuum calibration.

The synthesis and properties of thermoplastic polyurethanes which have been prepared by continuous synthesis are compiled in table 3 and table 4.

TABLE 3

Examples of synthesis:

|  | Example 5 | Example 6 | Example 7 | Example 8 |
|---|---|---|---|---|
| Polyol 1 [g] | 1000 | 750 | 750 | 750 |
| Isocyanate 1 [g] | 920 | 690 | 690 | 690 |
| CE 1 [g] | 206.4 | 152.71 | 154.83 | 154.83 |
| Stabilizer 1 [g] | 21.5 | 16.1 |  | 16.1 |
| Catalyst 1 [ppm] |  | 20 | 30 | 20 |
| Index | 1000 | 1000 | 990 | 990 |

TABLE 4

Examples of properties:

|  | Example 5 | Example 6 | Example 7 | Example 8 |
|---|---|---|---|---|
| Shore D |  | 56 | 55 | 54 |
| Modulus of elasticity [MPa] |  |  | 66 | 63 |

TABLE 4-continued

Examples of properties:

|  | Example 5 | Example 6 | Example 7 | Example 8 |
|---|---|---|---|---|
| Tensile strength [MPa] | 42 | 49 |  | 56 |
| Elongation at break [%] | 460 | 510 |  | 530 |
| Tear propagation resistance [kN/m] | 131 | 119 |  | 123 |
| Compression set (72 h/23° C./30 min) [%] | 27 | 26 |  | 26 |
| Compression set (24 h/70° C./30 min) [%] | 44 | 42 |  | 42 |
| Compression set (24 h/100° C./30 min) [%] | 55 | 65 |  | 75 |
| Abrasion [mm$^3$] | 34 | 33 |  | 38 |
| Hose appearance | translucent | transparent | transparent | transparent |
| Burst pressure of non-heat-treated 5.8 * 8.2 mm hoses at 23° C. [bar] | 35.7 | 33.1 | 32.9 | 32.2 |
| Burst pressure of non-heat-treated 5.8 * 8.2 mm hoses at 70° C. [bar] |  | 21.5 | 21.3 | 21.2 |
| Burst pressure of heat-treated 5.8 * 8.2 mm hoses at 23° C. [bar] | 39.6 | 37.7 | 36.8 | 35 |
| Burst pressure of heat-treated 5.8 * 8.2 mm hoses at 70° C. [bar] |  | 24.0 | 25.3 | 22.4 |
| Burst pressure of non-heat-treated 5.8 * 8.2 mm hoses at 60° C. [bar] | 21.5 |  |  |  |
| Burst pressure of heat-treated 5.8 * 8.2 mm hoses at 60° C. [bar] | 26.3 |  |  |  |
| Burst pressure of non-heat-treated 5.8 * 8.2 mm hoses at 80° C. [bar] | 18.5 |  |  |  |
| Burst pressure of heat-treated 5.8 * 8.2 mm hoses at 80° C. [bar] | 22.6 |  |  |  |
| TMA onset temperature (ΔT 20° C./min) [° C.] |  | 199 |  | 197 |
| Creep characteristics [%] | 5.9 | 4.0-4.9 |  |  |

The TMA onset temperature reported in table 4 serves as a measure of heat distortion resistance. The TMA was measured at a heating rate of 20° C./min. The onset temperature was reported

2. Preparation Example II

The following feedstocks were used:
Polyol 1: Polyether polyol having an OH number of 112.2 and exclusively primary OH groups (based on tetramethylene oxide, functionality: 2)
Polyol 2: Polyester polyol having an OH number of 56 and exclusively primary OH groups (based on hexanediol, butanediol, adipic acid, functionality: 2)
Isocyanate 1: aromatic isocyanate (4,4' methylene diphenyl diisocyanate)
CE 1: propane-1,3-diol
CE 2: butane-1,4-diol
Catalyst 1: tin(II) isooctoate (50% in dioctyl adipate)
Stabilizer 1: sterically hindered phenol The products prepared using butane-1,4-diol as chain extender serve as comparative examples.

TABLE 5

Examples of synthesis:

|  | Example 9 | Example 10 | Example 11 (corresponding to example 8) |
|---|---|---|---|
| Polyol 1 [g] |  | 750 | 750 |
| Polyol 2 [g] | 750 |  |  |
| Isocyanate 1 [g] | 585 | 690 | 690 |
| CE 1 [g] |  |  | 154.83 |
| CE 2 [g] | 175.76 | 180.84 |  |
| Stabilizer 1 [g] |  |  | 16.1 |
| Catalyst 1 [ppm] | 20 | 20 | 20 |
| Index | 990 | 990 | 990 |

TABLE 6

Examples of properties:

|  | Example 9 | Example 10 | Example 11 (corresponding to example 8) |
|---|---|---|---|
| Shore D | 51 | 56 | 54 |
| Modulus of elasticity [MPa] | 123 | 77 | 63 |
| Tensile strength [MPa] | 52 | 53 | 56 |
| Elongation at break [%] | 530 | 510 | 530 |
| Tear propagation resistance [kN/m] | 133 | 127 | 123 |
| Compression set (72 h/23° C./30 min) [%] |  |  | 26 |
| Compression set (24 h/70° C./30 min) [%] |  |  | 42 |
| Compression set (24 h/100° C./30 min) [%] |  |  | 75 |

TABLE 6-continued

| Examples of properties: | | | |
|---|---|---|---|
| | Example 9 | Example 10 | Example 11 (corresponding to example 8) |
| Abrasion [mm³] | 40 | 35 | 38 |
| Burst pressure of non-heat-treated 5.8 * 8.2 mm hoses at 23° C. [bar] | 32.4 | 27.1 | 32.2 |
| Burst pressure of non-heat-treated 5.8 * 8.2 mm hoses at 70° C. [bar] | 20.3 | 12.6 | 21.2 |
| Burst pressure of heat-treated 5.8 * 8.2 mm hoses at 23° C. [bar] | 33.4 | 27.7 | 35 |
| Burst pressure of heat-treated 5.8 * 8.2 mm hoses at 70° C. [bar] | 21.5 | 17.5 | 22.4 |
| Burst characteristics non-heat-treated 23° C. | localized | inflates before bursting | localized |
| Burst characteristics non-heat-treated 70° C. | localized | | localized |
| Transparency (visual) | translucent to opaque | transparent | transparent |
| Hydrolysis stability (in water) | ≥56 days (80° C.) | ≥200 days (85° C.) | ≥200 days (85° C.) |
| TMA onset temperature (ΔT 20° C./min) [° C.] | | 177 | 197 |
| Creep characteristics [%] | 7.4-8.8 | 6.9-8.9 | |

The creep characteristics were determined by elongating a heat-treated (20 h/100° C.) S1 tensile specimen by 5%. The force/tension that occurs at first at this elongation is maintained at room temperature for 12 hours. After relaxation, the difference in length is determined. The values reported reflect the scatter in the repetitions of the measurement conducted.

3. Preparation Example III

The following feedstocks were used:

Polyol 3: polyester polyol having an OH number of 56 and exclusively primary OH groups (based on adipic acid, butanediol and monoethylene glycol, functionality: 2)

Polyol 4: polyester polyol having an OH number of 52 and exclusively primary OH groups (based on adipic acid and monoethylene glycol, functionality: 2)

Isocyanate 2

(=Isocyanate 1): Aromatic Isocyanate (4,4' methylene diphenyl diisocyanate)

CE 1: propane-1,3-diol
CE 2: butane-1,4-diol
Catalyst 2: tin(II) isooctoate (50% in dioctyl adipate)
Stabilizer 2: sterically hindered phenol 3.1 Example of Batchwise Synthesis:

A thermoplastic polyurethane (TPU) was synthesized from diphenylmethane 4,4'-diisocyanate, propane-1,3-diol chain extender, phenolic antioxidant, and a polyadipic ester diol having an OH number of 56 while stirring in a reaction vessel. On attainment of a reaction temperature of 110° C., the solution was poured out onto a heated hot plate and the TPU sheet obtained was pelletized after heat treatment. The measured values were established using injection molded sheets or hoses, with the zone temperatures of the extruders used between 190° C. and 235° C.

The synthesis and properties of thermoplastic polyurethanes obtained are summarized in tables 7 and 8.

TABLE 7

| Examples of synthesis: | | | | |
|---|---|---|---|---|
| | Example 12 | Example 13 | Example 14 | Example 15 |
| Polyol 3 [g] | 700 | 700 | | |
| Polyol 4 [g] | | | 750 | 750 |
| Isocyanate 2 [g] | 653.3 | 630 | 600 | 600 |
| CE 1 [g] | 172.1 | | 151.9 | |
| CE 2 [g] | | 195.4 | | 179.9 |
| Stabilizer 2 [g] | | | 18.75 | 18.75 |
| Index | 1000 | 1000 | 1000 | 1000 |

TABLE 8

| Examples of properties: | | | | |
|---|---|---|---|---|
| | Example 12 | Example 13 | Example 14 | Example 15 |
| Shore D | 56 | 56 | | |
| Tensile strength [MPa] | 58 | 40 | | |
| Elongation at break [%] | 470 | 520 | | |
| Tear propagation resistance [kN/m] | 127 | 131 | | |
| Compression set (72 h/23° C./30 min) [%] | 24 | 25 | | |
| Compression set (24 h/70° C./30 min) [%] | 67 | 76 | | |
| Compression set (24 h/100° C./30 min) [%] | 46 | 49 | | |

TABLE 8-continued

Examples of properties:

| | Example 12 | Example 13 | Example 14 | Example 15 |
|---|---|---|---|---|
| Abrasion [mm³] | 29 | 33 | | |
| Burst pressure of non-heat-treated 5.8 * 8.2 mm hoses at 23° C. [bar] | 30.1 | 37.1 | 39.2 | 39.2 |
| Burst pressure of non-heat-treated 5.8 * 8.2 mm hoses at 70° C. [bar] | 14.6 | 20.6 | 22.1 | 20.8 |
| Burst pressure of heat-treated 5.8 * 8.2 mm hoses at 23° C. [bar] | 37.7 | 41.8 | 40.2 | 37.3 |
| Burst pressure of heat-treated 5.8 * 8.2 mm hoses at 70° C. [bar] | 21.5 | 30.8 | 23.2 | 25.0 |

3.2 Example of Continuous Synthesis

3.2.1 Belt Method:

A mixture of propane-1,3-diol chain extender, a phenolic antioxidant, and a polyadipic ester diol having an OH number of 56 was heated to 80° C. and mixed vigorously with diphenylmethane 4,4'-diisocyanate in a mixing head.

The reaction mixture obtained was applied at a temperature of 95° C. to a running PTFE belt. The reaction mixture, which had solidified to become a solid strip product (slab) at the end of the belt, was fed continuously and directly at about 80° C. via intake rollers to a comminution and homogenization apparatus. It was comminuted therein at temperatures of about 105° C. and conveyed into a tangential flange-mounted single-shaft extruder. The housing temperatures in the intake region were about 170° C. to 190° C., and in the middle zone 190 to 220° C. The melt that exits at the die plate was converted by an underwater pelletization to homogeneous lenticular pellets and then dried.

3.2.2 Reactive Extrusion Method:

The first housing of a ZSK 92 twin-shaft extruder from Werner & Pfleiderer, Stuttgart, having a process length of 56 D, was charged with a mixture of the propane-1,3-diol chain extender, a phenolic antioxidant and a polyadipic ester diol having an OH number of 56 and a catalyst with a charge temperature of 150° C. and, separately therefrom, the diphenylmethane 4,4'-diisocyanate was metered into the first housing at a charge temperature of 65° C. The speed of the twin screw was 280 min⁻¹. The set temperature values for the housing were, in flow direction, 200° C. in the first third of the screw, 170° C. in the second third of the screw, and 190° C. in the last third of the screw. The expulsion rate was 850 kg/h. After the melt chopping by underwater pelletization and integrated centrifugal drying, the pellets were subjected to final drying at about 80 to 90° C.

The pellets were subsequently processed further by injection molding to give test specimens or by extrusion to give hoses. The hoses were run by extrusion in an Arenz 45 mm extruder with a 3-zone screw with a 9.8 mm die and a 6.9 mm mandrel. The zone temperatures were between 180 and 225° C. The hose geometry was adjusted by varying the draw-off speed and pressure in the water bath with vacuum calibration.

The synthesis and properties of thermoplastic polyurethanes which have been prepared by continuous synthesis are compiled in table 9 and table 10.

TABLE 9

Examples of synthesis:

| | Example 16 | Example 17 | Example 18 | Example 19 |
|---|---|---|---|---|
| Polyol 2 [g] | 1000 | 1000 | 1000 | 1000 |
| Isocyanate 2 [g] | 787.3 | 780 | 806.5 | 780 |
| CE 1 [g] | 203.9 | | 206.1 | |
| CE 2 [g] | | 238.2 | | 233.91 |
| Stabilizer 2 [g] | 8 | 8 | 8 | 8 |
| Catalyst 2 [ppm] | 0.5 | 0.5 | 0.5 | 0.5 |
| Index | 985 | 985 | 1000 | 1000 |

TABLE 10

Examples of properties:

| | Example 16 | Example 17 | Example 18 | Example 19 |
|---|---|---|---|---|
| Burst pressure of non-heat-treated 5.8 * 8.2 mm hoses at 23° C. [bar] | 33.4 | 31.2 | 36.5 | 30.9 |
| Burst pressure of non-heat-treated 5.8 * 8.2 mm hoses at 70° C. [bar] | 18.4 | 15.9 | 20.3 | 15.9 |
| Burst pressure of heat-treated 5.8 * 8.2 mm hoses at 23° C. [bar] | 36.0 | 35.7 | 37.1 | 35.3 |
| Burst pressure of heat-treated 5.8 * 8.2 mm hoses at 70° C. [bar] | 22.7 | 21.1 | 25.2 | 21.0 |

4. Test Methods

For the material characterization, it is possible to use test methods including the following: DSC, DMA, TMA, NMR, FT-IR, GPC, burst pressure measurement
Hardness DIN 53 505,
Tensile strength DIN 53 504,
Elongation at break DIN 53504,
Tear propagation resistance DIN 53 515,
Abrasion DIN 53 516

The invention claimed is:
1. A thermoplastic polyurethane, obtained by conversion of components consisting of:
 (i) methylene diphenyl diisocyanate;
 (ii) a chain extender that is propane-1,3-diol;
 (iii) a polyol which is polytetrahydrofuran;
 (iv) optionally a catalyst which is tin (II) isooctanoate; and
 (v) optionally a stabilizer,
  wherein the polyol has a mean functionality in a range of from 1.8 to 2.3, the polyol has a molecular weight, Mn, in a range of from 650 to 1400 g/mol, the polyol is present in an amount of from 25 to 50.2 wt. %, based on a total polyurethane chain component weight, the methylene diphenyl diisocyanate is present in a molar ratio to the chain extender in a range of from 1.16 to 1.6, and a molar ratio of a sum total of the functionalities of the polyol and chain extender to a sum total of the functionalities of the methylene diphenyl diisocyanate is in a range from 1:0.8 to 1:1.3, wherein the thermoplastic polyurethane has a Shore hardness in a range of from 60 A to 80 D, determined according to DIN 53505, and an elongation at break in a range of from 420 to 530%.

2. The polyurethane of claim 1, wherein an isocyanate index in the conversion is in a range from 965 to 1100.

3. The polyurethane of claim 1, which is translucent to transparent.

4. The polyurethane of claim 1, which is opaque.

5. The polyurethane of claim 1, wherein the components comprise the stabilizer.

6. The polyurethane of claim 1, wherein the stabilizer is present and is a sterically hindered phenol.

7. The polyurethane of claim 1, wherein, based on the total polyurethane chain component weight, the polyol is present in an amount of from 45.9 to 50.2 wt. %, the methylene diphenyl diisocyanate is present in an amount of from 38.6 to 43.4 wt. %, and the chain extender is present in an amount of from 9.6 to 12.8 wt. %, and wherein the molar ratio of the methylene diphenyl diisocyanate to the chain extender is at most 1.36.

8. The polyurethane of claim 1, wherein a molar ratio of component (iii) to component (ii) is 1:0.7 to 1:7.3.

9. The polyurethane of claim 1, wherein said polyol has a molecular weight, Mn, in a range of from 750 to 1400 g/mol.

10. A hose, comprising:
the polyurethane of claim 1.

11. The hose of claim 10, having a multilayer structure.

12. The hose of claim 10, which has been reinforced by fibers or weaves.

13. The hose of claim 10, which has been subjected to an after-treatment.

14. A process for preparing the polyurethane of claim 1, the process comprising:
converting the components to obtain the polyurethane.

15. A process for production of an injection molded product, extrusion product, film, or shaped body, the process comprising:
heating the polyurethane of claim 1 to obtain a heated thermoplastic polyurethane;
pelletizing the heated thermoplastic polyurethane to obtain pelletized thermoplastic polyurethane; and
injection molding or extruding the pelletized thermoplastic polyurethane to obtain the injection molded product, extrusion product, film, or shaped body.

16. The process of claim 15, wherein the shaped body is a hose.

* * * * *